United States Patent
Zhang et al.

(10) Patent No.: US 10,932,282 B2
(45) Date of Patent: Feb. 23, 2021

(54) SCHEDULING TIMELINE IN NEW RADIO-SPECTRUM SHARING (NR-SS)

(71) Applicant: QUALCOMM Incorporated, San Diego, CA (US)

(72) Inventors: Xiaoxia Zhang, San Diego, CA (US); Vikas Jain, San Diego, CA (US); Taesang Yoo, San Diego, CA (US); Tamer Kadous, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 16/129,545

(22) Filed: Sep. 12, 2018

(65) Prior Publication Data

US 2019/0110302 A1 Apr. 11, 2019

Related U.S. Application Data

(60) Provisional application No. 62/571,047, filed on Oct. 11, 2017.

(51) Int. Cl.
*H04W 72/04* (2009.01)
*H04W 72/12* (2009.01)
*H04L 1/18* (2006.01)
*H04W 74/08* (2009.01)

(52) U.S. Cl.
CPC ............ *H04W 72/12* (2013.01); *H04L 1/1861* (2013.01); *H04W 72/1289* (2013.01); *H04W 74/0808* (2013.01)

(58) Field of Classification Search
CPC ...... H04W 72/04; H04W 88/08; H04W 76/00
See application file for complete search history.

(56) References Cited

U.S. PATENT DOCUMENTS

| | | | |
|---|---|---|---|
| 10,123,358 B2* | 11/2018 | Fakoorian | H04W 74/0808 |
| 2016/0344526 A1 | 11/2016 | Fan et al. | |
| 2017/0048889 A1 | 2/2017 | Kadous et al. | |
| 2017/0202022 A1* | 7/2017 | Chendamarai Kannan | H04W 72/14 |
| 2017/0245313 A1* | 8/2017 | Kim | H04L 1/1854 |
| 2017/0295601 A1* | 10/2017 | Kim | H04W 72/0406 |

OTHER PUBLICATIONS

International Search Report and Written Opinion—PCT/US2018/050950—ISA/EPO—dated Nov. 23, 2018.

* cited by examiner

*Primary Examiner* — Hassan A Phillips
*Assistant Examiner* — Prenell P Jones
(74) *Attorney, Agent, or Firm* — Liem T. Do

(57) ABSTRACT

Wireless communications systems and methods related to determining scheduling and transmission timeline for communicating in a shared communication medium are provided. A first wireless communication device communicates, with a second wireless communication device, scheduling information during a first time period of a first transmission opportunity (TXOP) of a first network operating entity in a shared communication medium, the scheduling information indicating an offset time period relative to the first time period. The first wireless communication device communicates, with the second wireless communication device, a communication signal during a second TXOP subsequent to the first TXOP based on the offset time period.

21 Claims, 12 Drawing Sheets

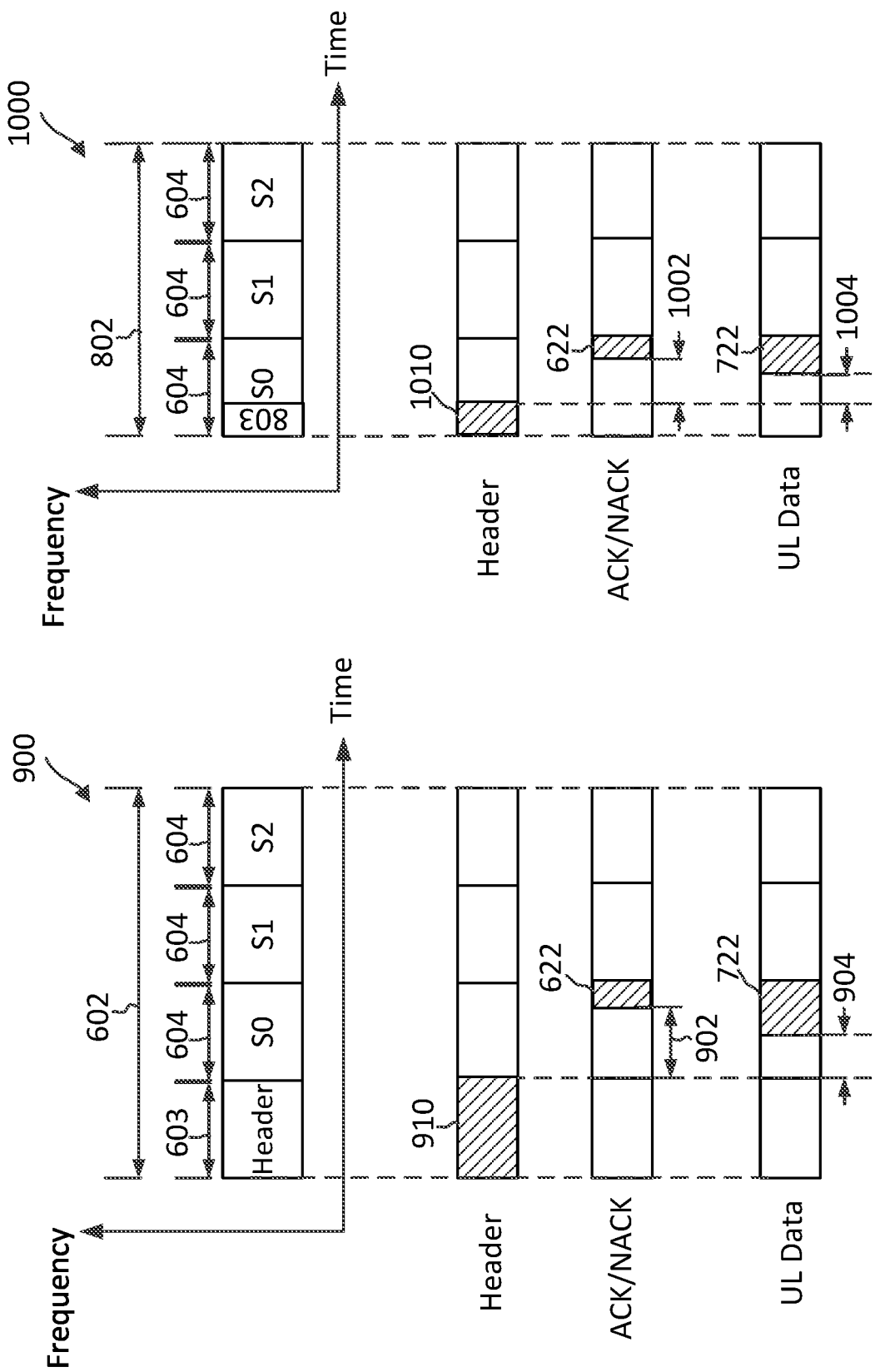

SCHEDULING TIMELINE IN NEW RADIO-SPECTRUM SHARING (NR-SS)

CROSS REFERENCE TO RELATED APPLICATIONS

The present application claims priority to and the benefit of the U.S. Provisional Patent Application No. 62/571,047, filed Oct. 11, 2017, which is hereby incorporated by reference in its entirety.

TECHNICAL FIELD

This application relates to wireless communication systems, and more particularly to determining scheduling and transmission timeline for communicating in a communication medium shared by multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

To meet the growing demands for expanded mobile broadband connectivity, wireless communication technologies are advancing from the LTE technology to a next generation new radio (NR) technology. NR may provision for dynamic medium sharing among network operators in a licensed spectrum, a shared spectrum, and/or an unlicensed spectrum. For example, shared spectrums and/or unlicensed spectrums may include frequency bands at about 3.5 gigahertz (GHz), about 6 GHz, and about 60 GHz.

One approach to avoiding collisions when communicating in a shared communication medium or a shared channel is to use a listen-before-talk (LBT) procedure to ensure that the shared channel is clear before transmitting a signal in the shared channel. For example, a transmitting node may listen to the channel to determine whether there are active transmissions in the channel. When the channel is idle, the transmitting node may proceed to reserve a transmission opportunity (TXOP) in the shared channel and communicate with a receiving node during the TXOP. Conversely, when the channel is busy, the transmitting node may yield channel access to the ongoing transmission. The transmitting node may wait for the ongoing transmission to complete and contend for a next TXOP. Thus, a pair of transmit-receive nodes transmitting node may communicate with each other in non-continuous time periods depending on when the pair of transmit-receive nodes can gain access to the channel. When a communication schedule is based on relative timing, a transmission time may fall outside a current TXOP of the pair of transmit-receive nodes.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a first wireless communication device with a second wireless communication device, scheduling information during a first time period of a first transmission opportunity (TXOP) of a first network operating entity in a shared communication medium, the scheduling information indicating an offset time period relative to the first time period; and communicating, by the first wireless communication device with the second wireless communication device, a communication signal during a second TXOP subsequent to the first TXOP based on the offset time period.

In an additional aspect of the disclosure, an apparatus includes a transceiver configured to communicate, with a second wireless communication device, scheduling information during a first time period of a first transmission opportunity (TXOP) of a first network operating entity in a shared communication medium, the scheduling information indicating an offset time period relative to the first time period; and communicate, with the second wireless communication device, a communication signal during a second TXOP subsequent to the first TXOP based on the offset time period.

In an additional aspect of the disclosure, a computer-readable medium having program code recorded thereon, the program code includes code for causing a first wireless communication device to communicate, with a second wireless communication device, scheduling information during a first time period of a first transmission opportunity (TXOP) of a first network operating entity in a shared communication medium, the scheduling information indicating an offset time period relative to the first time period; and code for causing the first wireless communication device to communicate, with the second wireless communication device, a communication signal during a second TXOP subsequent to the first TXOP based on the offset time period.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 9 illustrates a scheduling scheme according to embodiments of the present disclosure.

FIG. 10 illustrates a scheduling scheme according to embodiments of the present disclosure.

DETAILED DESCRIPTION

Figure 1:
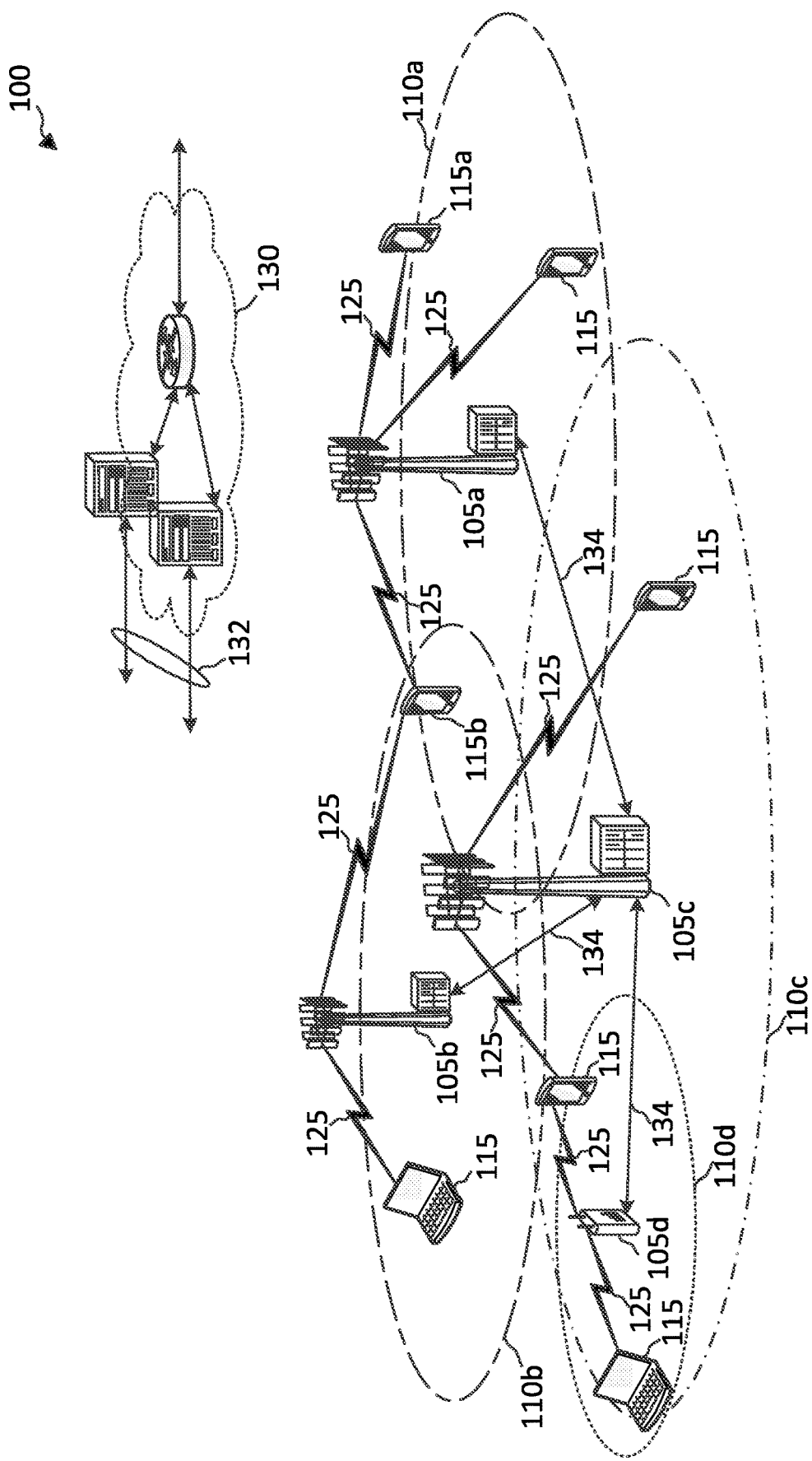
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWave bands) network.

The present disclosure describes mechanisms for determining scheduling timelines for communicating in a shared communication medium. For example, a BS of a particular operator (e.g., Operator A) may contend for transmission opportunities (TXOPs) in a communication medium shared by multiple network operating entities. The BS may successfully contend for a number of TXOPs. The TXOPs may be spaced from each other by TXOPs of other network operating entities (e.g., Operator B and/or Operator C). The BS may determine a schedule for communicating with a UE during a current TXOP using relative timing (e.g., with respect to a time at which the schedule is transmitted) without requiring knowledge of medium occupancy outside the current TXOP.

In an embodiment, when a UE receives a schedule from a BS indicating a relative time that corresponds to a time outside a current TXOP, the UE may wait for the BS to gain access to the medium in a subsequent TXOP and defer the transmission. In other words, the UE may skip over a time period that includes one or more TXOPs of one or more other network operating entities (e.g., Operator B and/or Operator C). For example, the BS may indicate an offset time period for a transmission grant relative to a current time period and the UE may compute a transmission time based on the offset time period, but may exclude any time period that are reserved by other network operating entities.

In an embodiment, each operator may reserve a portion of resources for other operators, for example, to transmit feedbacks (e.g., acknowledgements (ACKs) and/or negative acknowledgements (NACKs)). For example, when a UE receives a feedback schedule from a BS indicating a relative time corresponding to a time outside of the current TXOP, the UE may proceed to transmit according to the schedule using a resource in a TXOP of another operator. The resource can be time-division multiplexed, frequency-division multiplexed, code-division multiplexed, and/or spatial-division multiplexed with a resource of the other operator.

Aspects of the present application can provide several benefits. For example, the exclusion of TXOPs of another operator in a scheduling timeline and/or the reservation of a portion of resources for another operator in a TXOP can enable a BS to determine schedules without the need to have medium occupancy information beyond a current TXOP. In addition, the reservation of a portion of resources for another operator in a TXOP can allow the other operator to communicate information (e.g., ACK/NACKs) that may require a low latency.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB), a next generation NodeB (gNB), or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (01-DM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication tha UL communication. A UL-centric subframe may include a longer duration for UL communication tha UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In an embodiment, the network 100 may operate over a shared channel, which may include a licensed spectrum, a shared spectrum, and/or an unlicensed spectrum, and may support dynamic medium sharing. The BSs 105 and the UEs 115 may be operated by multiple network operating entities sharing resources in the shared channel. A BS 105 or a UE 115 may reserve TXOP in the shared channel by transmitting a reservation request signal prior to transmitting data in the TXOP. A corresponding receiving node (e.g., a BS 105 or a UE 115) may respond by transmitting a reservation response signal. To avoid collisions, other BSs 105 and/or other UEs 115 may listen to the channel and refrain from accessing the channel during the TXOP upon detection of the reservation request signal and/or the reservation response signal. As such, a BS 105 of a particular network operating entity may not gain continuous access to the channel. However, the BS 105 may indicate scheduling information (e.g., including DL and UL grants) using relative time. Depending on the type of communications and the configuration of the network 100, the BS 105 and a corresponding scheduled UE 115 may determine a transmission time and/or a reception time based on a relative time in a transmission grant by excluding time periods that are reserved by other network operating entities or allowing a transmission time to be within a time period reserved by another network operating entity. Mechanisms for determining scheduling and/or transmission timeline are described in greater detail herein.

Figure 2:
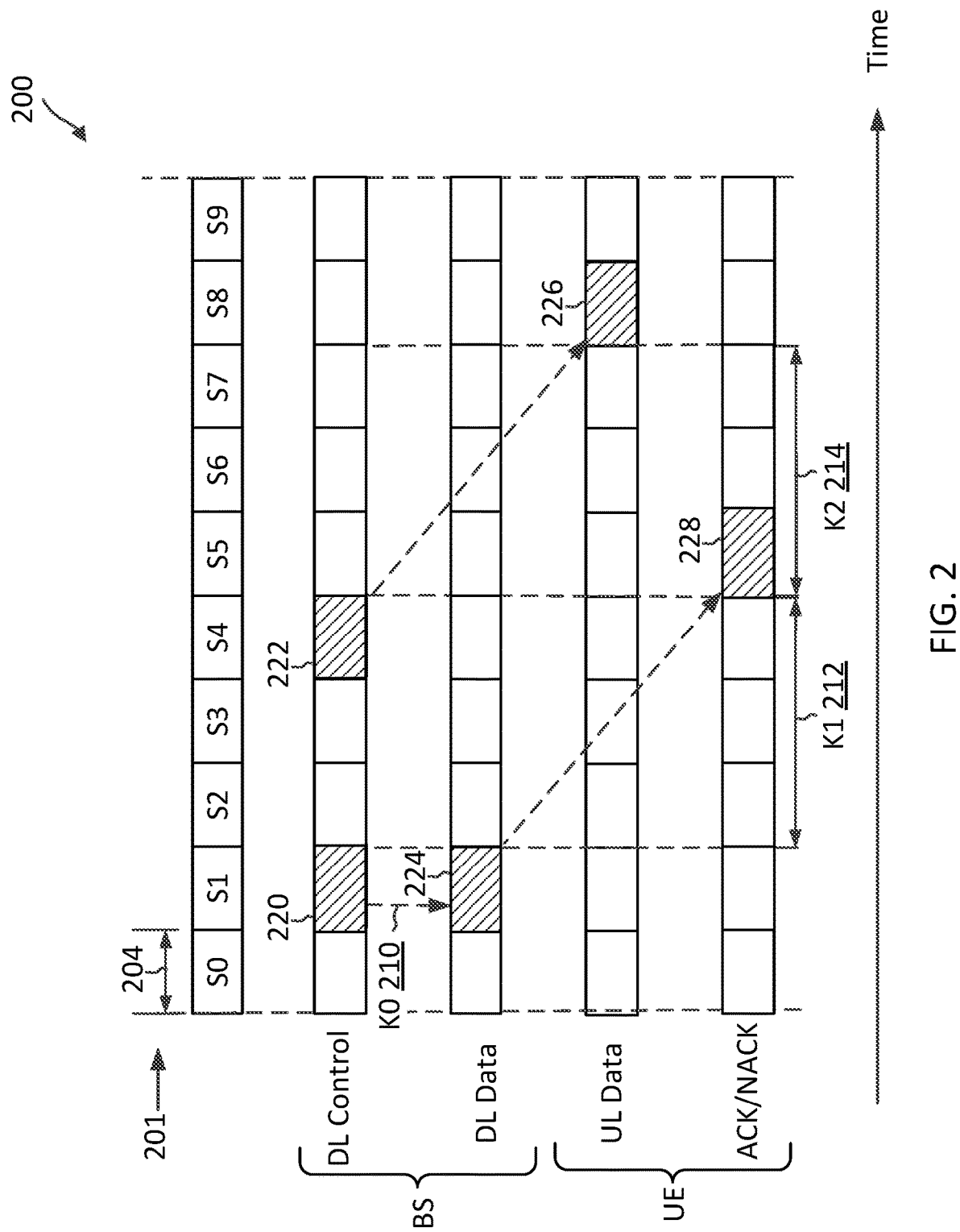
FIG. 2 illustrates a scheduling timeline according to embodiments of the present disclosure.

FIG. 2 illustrates a scheduling timeline 200 according to embodiments of the present disclosure. The scheduling timeline 200 may correspond to a scheduling timeline communicated between a BS 105 and a UE 115 of the network 100. In FIG. 2, the x-axis represents time in some constant units. FIG. 2 shows a frame structure 201 including a plurality of slots 204 in time. The slots 204 are indexed from S0 to S9. For example, a BS may communicate with a UE in units of slots 204. The slots 204 may also be referred to as transmission time intervals (TTIs). Each slot 204 or TTI carry a medium access control (MAC) layer transport block. Each slot 204 may include a number of symbols in time and a number of frequency tones in frequency. Each slot 204 may include a DL control portion followed by at least one of a subsequent DL data portion, UL data portion, and/or a UL control portion. In the context of LTE, the DL control portion, the DL data portion, the UL data portion, and the UL control portion may be referred to as a physical downlink control channel (PDCCH), a physical downlink shared channel (PDSCH), a physical uplink shared channel (PUSCH), and a physical uplink control channel (PUCCH), respectively.

The BS and the UE may further communicate based on a parameter 210, denoted as K0, a parameter 212, denoted as K1, and a parameter 214, denoted as K2. The parameter 210 indicates a time period between a DL grant and a corresponding DL transmission. The parameter 212 indicates a time period between a DL data reception and a corresponding ACK or NACK transmission. The parameter 214 indicates a time period between a UL grant and a corresponding UL data transmission. The parameters 210, 212, and 214 may be pre-configured by the network and may be indicated in units of slots 204. In the context of LTE, the parameters 210, 212, and 214 may be indicated in a downlink control information (DCI) carried in a PDCCH.

As an example, the parameter 210 may indicate a value 0 (e.g., K0=0), the parameter 212 may indicate a value of 4 (e.g., K1=4), and the parameter 214 may indicate a value of 4 (e.g., K2=4). The pattern-filled boxes represent transmissions of DL control information, DL data, UL data, an ACK, and/or an NACK in corresponding slots 204. While an entire slot 204 is pattern-filled, a transmission may occur only in a corresponding portion of the slot 204. As shown, the BS transmits DL control information 220 in the slot 204 indexed S1 (e.g., in a DL control portion of the slot 204). The DL control information 220 may indicate a DL grant for the UE in the same slot 204 indexed S1 (e.g., K0=0). Thus, the BS transmits a DL data signal 224 to the UE in the slot 204 indexed S1 (e.g., in a DL data portion of the slot 204). The UE may receive the DL control information 220 and receive the DL data signal 224 based on the DL grant.

After receiving the DL data signal 224, the UE 115 may report a reception status of the DL data signal 224 to the BS by transmitting an ACK/NACK signal 228 in the slot 204 indexed S5 (e.g., in a UL data portion or a UL control portion of the slot 204) based on the parameter 212 (e.g., K1=4). The slot 204 indexed S5 is a fourth slot from the slot 204 indexed S1. The ACK/NACK signal 228 refers to a feedback signal carrying an ACK or an NACK. The UE may transmit an ACK when the reception of the DL data signal 224 is successful. Alternatively, the UE may transmit an NACK when the reception of the DL data signal 224 is unsuccessful (e.g., including an error or failing an error correction).

The ACK/NACK signal 228 may be associated with a hybrid automatic repeat request (HARQ) process. In a HARQ process, a transmitting node may transmit various coded versions of information data to a receiving node. For example, the transmitting node may transmit a first coded version of information data to the receiving node. Upon receiving an NACK signal from the receiving node, the transmitting node may transmit a second coded version of the information data to the receiving node. The receiving node may combine the received first coded version and the received second coded version for error correction when both the received first coded version and the received second coded version are erroneous.

The BS further transmits DL control information 222 in the slot 204 indexed S4 (e.g., in a DL control portion of the slot 204). The DL control information 222 may indicate a UL grant for the UE. The UE transmits a UL data signal 226 to the BS in the slot 204 indexed S8 (e.g., in a UL data portion of the slot 204) based on the UL assignment and the parameter 214 (e.g., K2=4). The slot 204 indexed S8 is a fourth slot from the slot 204 indexed S4.

As can be observed, a BS may indicate scheduling information using relative timing (e.g., an offset time period relative to a current time period in which the scheduling information is communicated).

Figure 3:
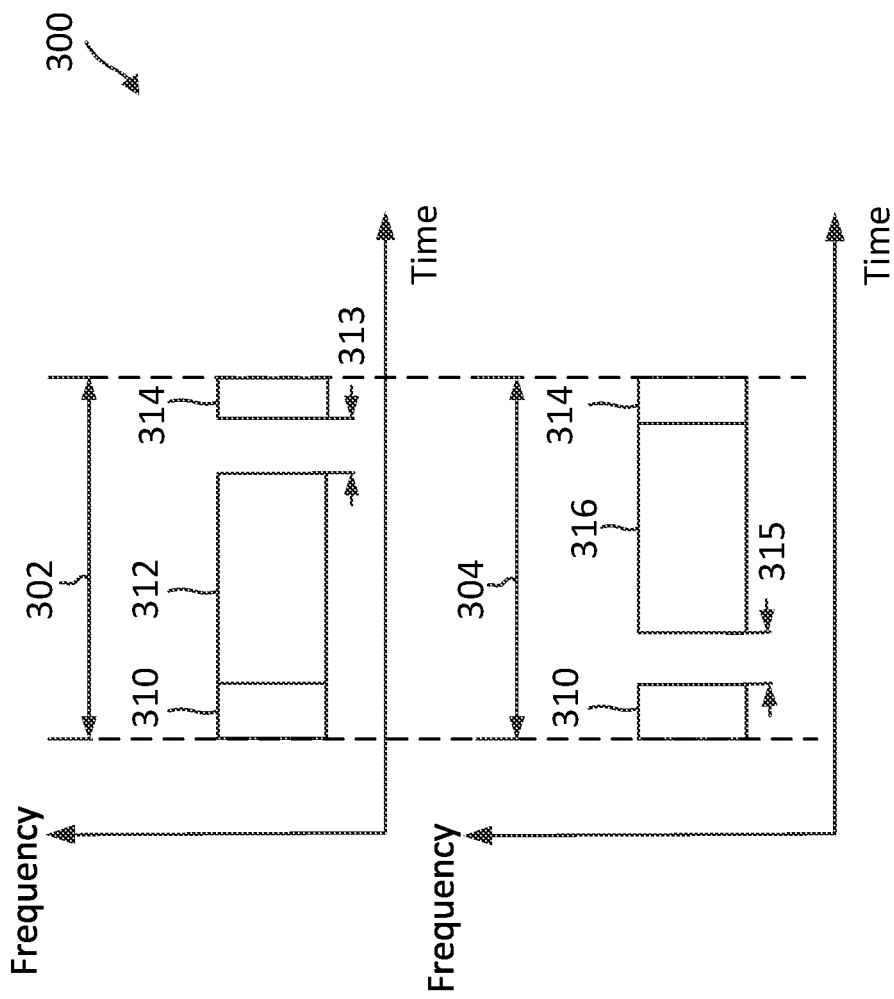
FIG. 3 illustrates a slot configuration according to embodiments of the present disclosure.

FIG. 3 illustrates a subframe configuration 300 according to embodiments of the present disclosure. The configuration 300 may be employed by the BSs 105 and the UEs 115. The configuration 300 is suitable for use in an NR network (e.g., the network 100). In FIG. 3, the x-axes represent time in some constant units and the y-axes represent frequency in some constant units. The configuration 300 shows two self-contained subframes 302 and 304. For example, the BSs 105 and the UEs 115 may communicate with each other in units of the subframes 302 and 304. The subframes 302 and 304 may provide similar functionalities as the slots 204, but may allow for a lower-latency, as described in greater detail herein. The subframes 302 and 304 may also be referred to as TTIs. The subframe 302 is configured for carrying a DL data transmission. Thus, the subframe 302 is a DL-centric subframe. The subframe 304 is configured for carrying a UL data transmission. Thus, the subframe 304 is a UL-centric subframe.

As shown, the DL-centric subframe 302 includes a DL control portion 310 for carrying DL control information (e.g., the DL control information 220), a DL data portion 312 for carrying DL data (e.g., the DL data signal 224), and a UL control portion 314 for carrying UL control information (e.g., the ACK/NACK signal 228, scheduling request, and/channel reports). The UL-centric subframe 304 includes a DL control portion 310 for carrying DL control information, a UL data portion 316 for carrying UL data (e.g., the UL data signal 226), and a UL control portion 314 for carrying UL control information (e.g., the ACK/NACK signal 228, scheduling request, and/channel reports).

The DL-centric subframe 302 further includes a gap period 313 between the DL data portion 312 and the UL data portion 316. The UL-centric subframe 304 further includes a gap period 315 between the DL control portion 310 and the UL data portion 316. The gap periods 313 and 315 allow time for a node (e.g., a BS or a UE) to switch between receiving and transmitting and/or any processing. In the context of NR, the DL control portion 310, the DL data portion 312, the UL data portion 316 may be referred to as a new radio-physical downlink control channel (NR-PDCCH), a new radio-physical downlink shared channel (NR-PDSCH), and a new radio-physical uplink shared channel (NR-PUSCH signal), respectively.

The inclusion of the UL control portion 314 in the DL-centric subframe 302 can allow a UE to transmit a feedback (e.g., an ACK or an NACK) to a BS based on a DL data reception in the DL data portion 312. Thus, the DL-centric subframe 302 can provision for fast feedback or low-latency. However, the fast feedback may be dependent on a UE capability. For instance, a UE can report capability information to a BS. The capability information may include a parameter N1 and a parameter N2. The parameter N1 indicates an amount of time in a number of OFDM symbols required for UE processing from the end of a DL data reception to an earliest start of a corresponding ACK/NACK transmission from the UE. The parameter N2 indicates an amount of time in a number of OFDM symbols required for UE processing from the end of a DL control signal reception, where the DL control signal includes a UL grant, to an earliest start of a corresponding UL data transmission from the UE. The parameters N1 and N2 may not include timing-advance adjustments.

The BS may determine a schedule for the UE based on the parameters N1 and N2 reported by the UE. For example, the BS may schedule the UE to transmit an ACK/NACK signal in the UL control portion 314 for a DL data signal in the DL data portion 312 when the parameter N1 corresponds to a time period shorter than the gap period 313. Similarly, the BS may transmit a UL grant in the DL control portion 310 of the subframe 304 to schedule the UE to transmit a UL data signal in the UL data portion 316 of the subframe 304 when the parameter N2 corresponds to a time period shorter than the gap period 315.

Alternatively, a network (e.g., the network 100) may pre-configure the parameters N1 and/or N2 and a BS may determine schedules based on the pre-configured parameters N1 and N2 instead of based on UE capability reports. When the parameters N1 and N2 are pre-configured by the network, a UE may discard a schedule from the BS when the schedule does not provide a sufficient amount of time for UE processing.

Figure 4:
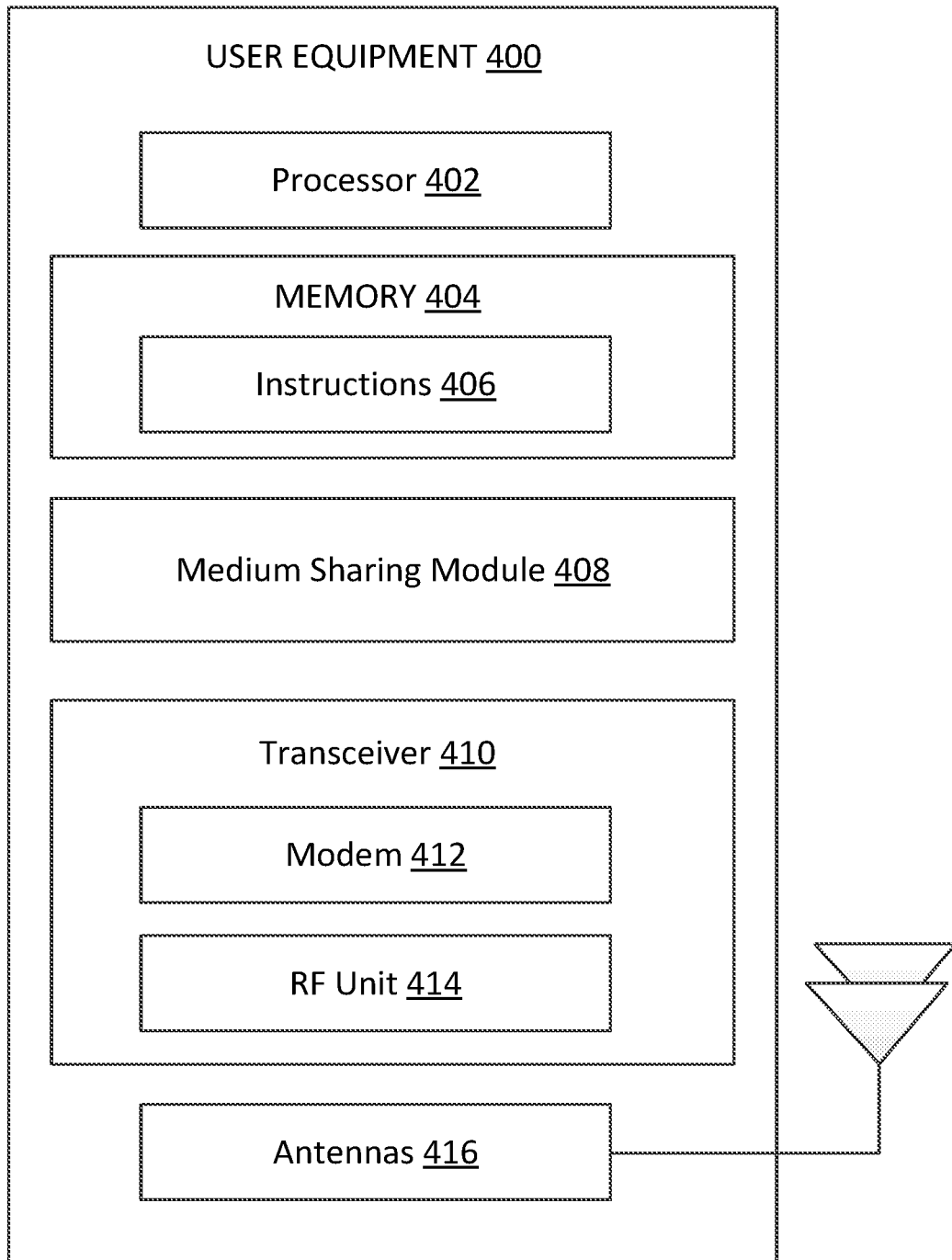
FIG. 4 is a block diagram of an exemplary user equipment (UE) according to embodiments of the present disclosure.

FIG. 4 is a block diagram of an exemplary UE 400 according to embodiments of the present disclosure. The UE 400 may be a UE 115 as discussed above. As shown, the UE 400 may include a processor 402, a memory 404, a medium sharing module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 115 in connection with embodiments of the present disclosure. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The medium sharing module 408 may be implemented via hardware, software, or combinations thereof. For example, the medium sharing module 408 may be implemented as a processor, circuit, and/or instructions 406 stored in the memory 404 and executed by the processor 402. The medium sharing module 408 may be used for various aspects of the present disclosure. For example, the medium sharing module 408 is configured to perform LBT in a shared communication medium, transmit and/or receive reservation signals, receive DL and/or UL grants from a BS (e.g., the BSs 105), determine reception and/or transmission time based on the received DL and/or UL grants (e.g., including relative timing), transmit and/or receive based on determined transmission and/or receive time, and/or transmit capability reports to a BS, as described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404 and/or the medium sharing module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of reservation signals, reservation response signals, and/or any communication signal according to embodiments of the present disclosure. The antennas 416 may further receive data messages transmitted from other devices. This may include, for example, reception of UL grants and/or DL grants according to embodiments of the present disclosure. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

Figure 5:
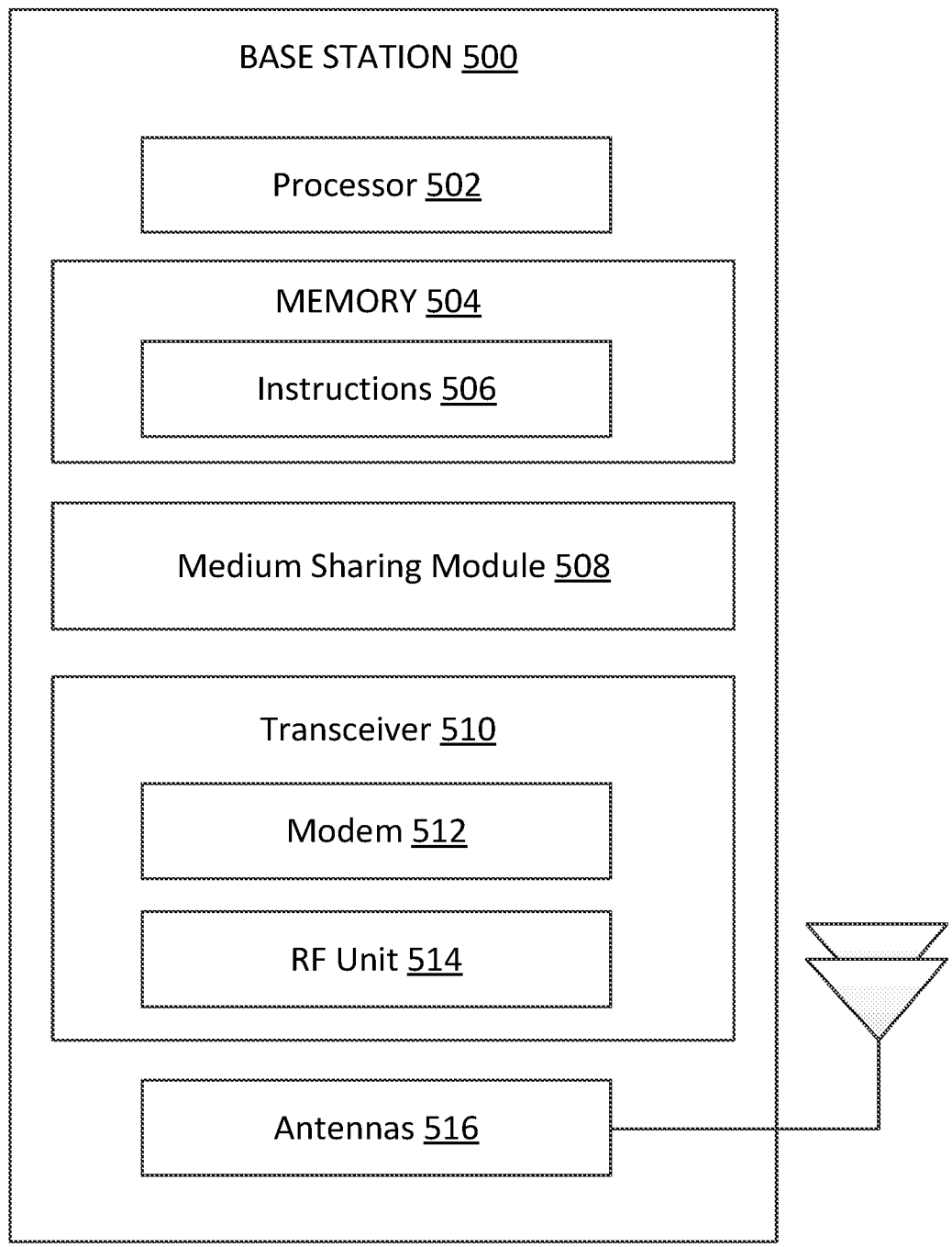
FIG. 5 is a block diagram of an exemplary base station (BS) according to embodiments of the present disclosure.

FIG. 5 is a block diagram of an exemplary BS 500 according to embodiments of the present disclosure. The BS 500 may be a BS 105 as discussed above. A shown, the BS 500 may include a processor 502, a memory 504, a medium sharing module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein. Instructions 506 may also be referred to as code, which may be interpreted broadly to include any type of computer-readable statement(s) as discussed above with respect to FIG. 5.

The medium sharing module 508 may be implemented via hardware, software, or combinations thereof. For example, the medium sharing module 508 may be implemented as a processor, circuit, and/or instructions 506 stored in the memory 404 and executed by the processor 502. The medium sharing module 508 may be used for various aspects of the present disclosure. For example, the medium sharing module 508 is configured to perform LBT in a shared communication medium, transmit and/or receive reservation signals, determine DL and/or UL grants for UEs (e.g., the UEs 115), determine reception and/or transmission time based on the determined DL and/or UL grants (e.g., including relative timing), transmit and/or receive based on determined transmission and/or receive time, reserve resources for other network operating entities, and/or receive capability reports to a BS, as described in greater detail herein.

As shown, the transceiver 510 may include the modem subsystem 512 and the RF unit 514. The transceiver 510 can be configured to communicate bi-directionally with other devices, such as the UEs 115 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115. The RF unit 514 may be further configured to perform analog beamforming in conjunction with the digital beamforming. Although shown as integrated together in transceiver 510, the modem subsystem 512 and the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 according to embodiments of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links.

Figure 6:
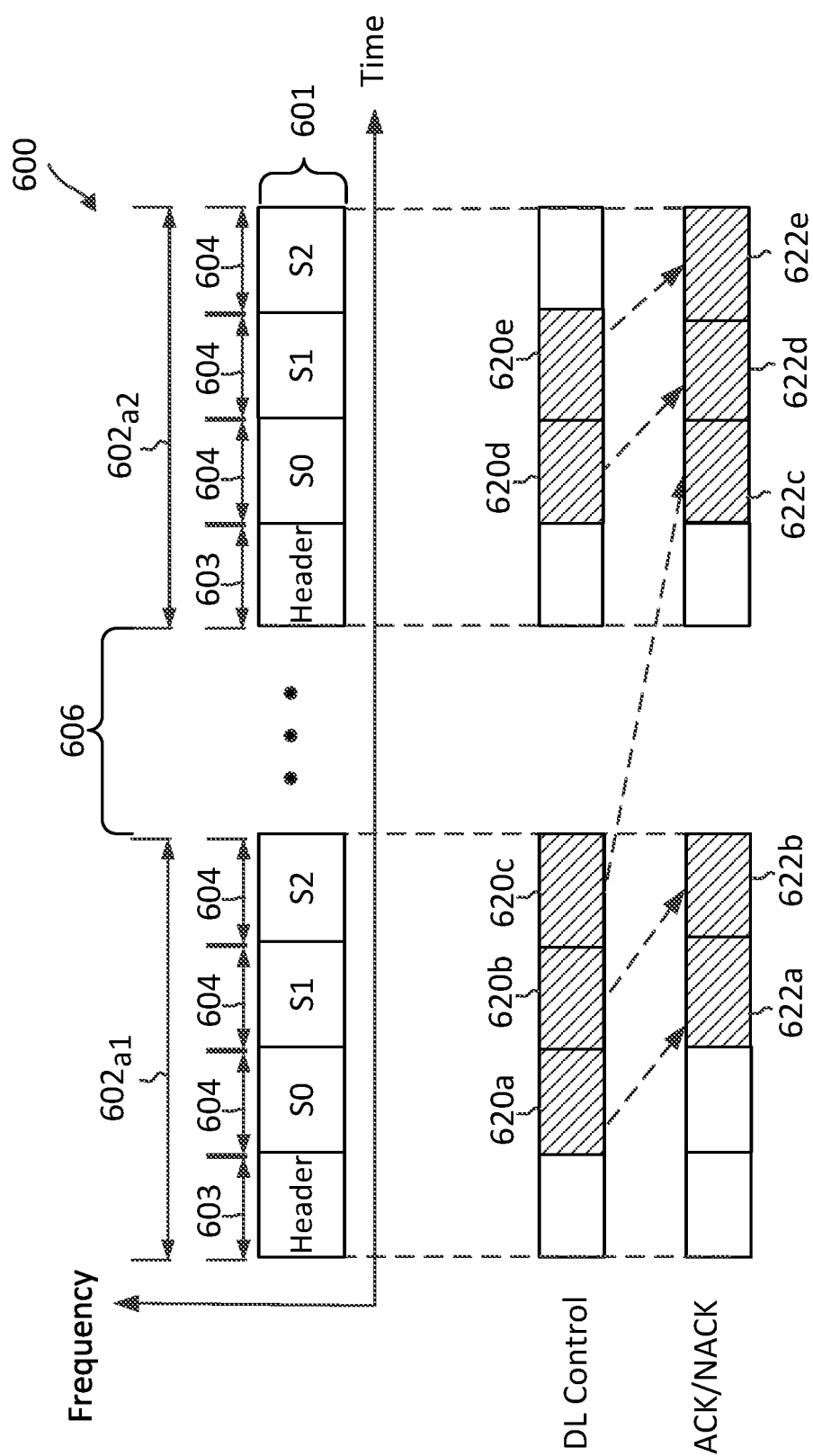
FIG. 6 illustrates a scheduling scheme for feedback transmissions according to embodiments of the present disclosure.
Figure 7:
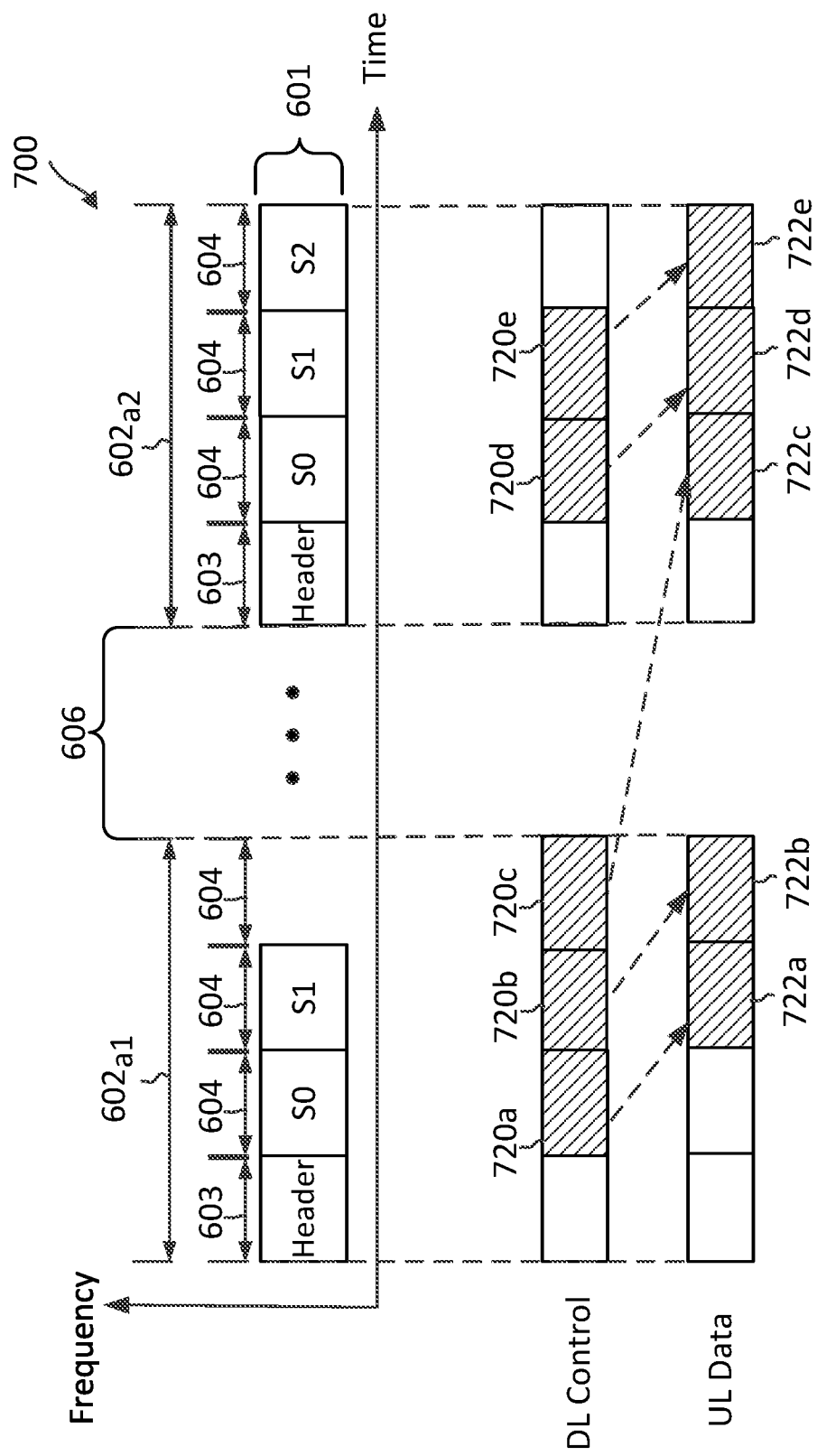
FIG. 7 illustrates a scheduling scheme for uplink (UL) data transmissions according to embodiments of the present disclosure.
Figure 8:
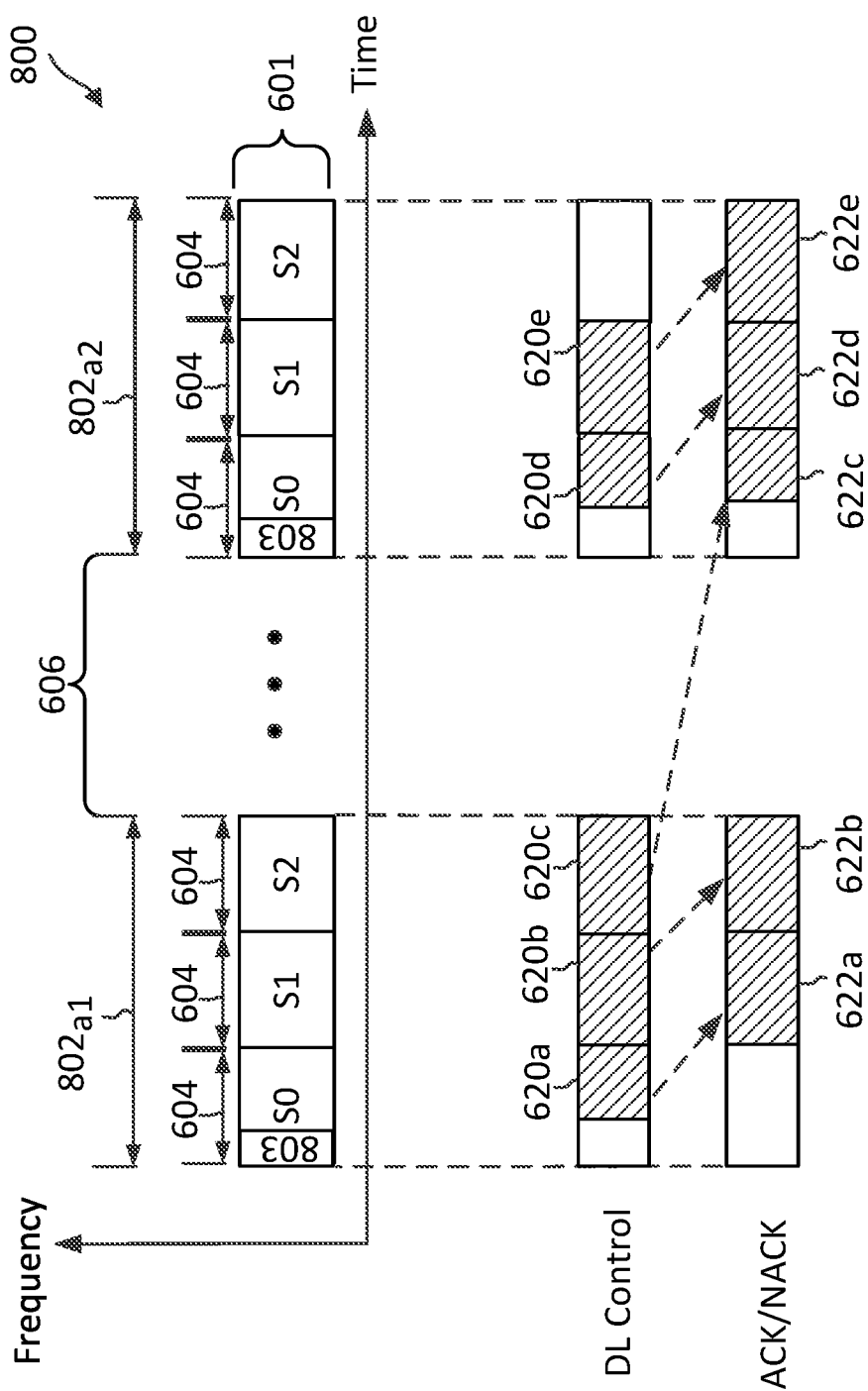
FIG. 8 illustrates a scheduling scheme for feedback transmissions according to embodiments of the present disclosure.

FIGS. 6-8 illustrate various mechanisms for determining scheduling time for communicating in a shared communication medium by skipping over (e.g., excluding) TXOPs of other network operating entities when a schedule uses relative timing. In FIGS. 6-8, the x-axes represent time in some constant units and the y-axes represent frequency in some constant units. The pattern-filled boxes represent transmissions of DL control, UL data, and/or ACK/NACK feedbacks in corresponding slots. While an entire slot is shown as pattern-filled, a transmission may occur only in a corresponding portion of the slot.

FIG. 6 illustrates a scheduling scheme 600 for feedback transmissions according to embodiments of the present disclosure. The scheme 600 may be employed by the BSs 105 and 500 and the UEs 115 and 400. In the scheme 600, a BS of a particular operating entity (e.g., Operator A) may successfully contend for a plurality of TXOPs 602 in a shared frequency spectrum 601. The TXOPs 602 may be non-continuous in time. As shown, the TXOPs $602_{a1}$ and $602_{a2}$ are separated by a time period 606 corresponding to TXOPs of other network operating entities (e.g., Operators B and C). Each TXOP 602 may include a header 603 followed by a plurality of slots 604. The slots 604 may be similar to the subframes 302 and 304 and the slots 204. For example, the slots 604 may include a DL control portion (e.g., the DL control portions 310) followed by at least one of a DL data portion (e.g., the DL data portion 312), a UL control portion (e.g., the UL control portion 314), or a UL data portion (e.g., the UL data portion 316). In some embodiments, each slot 604 may include a duration of about 1 millisecond (ms) or about 0.5 ms. While FIG. 6 illustrates the TXOPs 602 including three slots 604, the TXOPs 602 can include any suitable number of slots 604. For example, a TXOP 602 can include between four to ten slots 604.

The header 603 may carry reservation information associated with a corresponding TXOP 602. For example, the BS may send a reservation request signal to indicate a reservation for a TXOP 602. The reservation request signal can include a preamble (e.g., a predetermined sequence or a request-to-send (RTS) signal) and/or trigger information. The trigger information can include scheduling information indicating UEs that are scheduled for communications with the BS during the TXOP 602. A triggered or scheduled UE may respond to the reservation request signal with a reservation response signal. The reservation response signal can include a preamble (e.g., a predetermined sequence or a clear-to-send (CTS) signal) and/or the received trigger information. Other nodes in the network may listen to the channel. Upon detecting the reservation request signal and/or the reservation response signal, the other nodes may yield access to the frequency spectrum 601 during the TXOP 602. In some embodiments, the header 603 may have the same duration as the slot 604. Thus, the header 603 may be regarded as an additional slot 604 and may be referred to as a header slot.

As an example, the scheme 600 may assign a value of 0 to the parameter K0 (e.g., the parameter 210) and a value of 1 to the parameter K1 (e.g., the parameter 212). As shown, the BS transmits a DL control signal 620 in each slot 604. Each DL control signal 620 may include scheduling information. The scheduling information may indicate a DL grant for the UE in a current slot 604 and may instruct the UE to transmit an ACK/NACK in a subsequent slot 604. In some embodiments, the BS and the UE may use HARQ for retransmissions and the ACK/NACKs may be HARQ ACK/NACKs.

In the TXOP $602_{a1}$, the UE may receive a DL data signal in the slot 604 indexed S0 based on a DL grant in the DL control signal 620a and may respond by transmitting an ACK/NACK signal 622a in a subsequent slot 604 indexed S1. This ACK/NACK response process may repeat in the TXOP $602_{a1}$. For example, the UE may receive a DL data signal in the slot 604 indexed S1 based on a DL grant in the DL control signal 620b and may respond by transmitting an ACK/NACK signal 622b in a subsequent slot 604 indexed S2. However, the UE may not be able to transmit an ACK/NACK signal in the current TXOP $602_{a1}$ for a DL data signal received in the last slot 604 indexed S2 since a subsequent slot time is outside the current TXOP $602_{a1}$.

In the scheme 600, the UE may wait for a later time when the BS can gain access to the channel or the frequency spectrum 601, for example, in a subsequent TXOP $602_{a2}$. In other words, the UE may skip over the period 606 (e.g., TXOPs reserved by other network operating entities) and transmit an ACK/NACK signal 622c for a DL data signal received in the subsequent TXOP $602_{a2}$ based on the DL control signal 620c. The UE may further skip over the header 603 in the TXOP $602_{a2}$ and transmit the ACK/NACK signal 622c in the slot 604 indexed S0 of the TXOP $602_{a2}$. Subsequently, the UE may transmit ACK/NACK signals 622d and 622e in response to the DL control signals 620d and 620e, respectively, using similar mechanisms.

In one embodiment, the BS may pre-configure the UE to skip over headers 603 of TXOPs 602 when determining a transmission time. In another embodiment, the BS may indicate a value of 2 for K1 in the DL control signal 620c. In such an embodiment, the UE may regard the header 603 as a slot when determining a slot 604 in the TXOP $602_{a2}$ for the transmission of the ACK/NACK signal 622c. In yet another embodiment, the header 603 may be subsumed within a slot 604

As can be seen, in the scheme 600, a UE may reinterpret scheduling information that includes relative timing (e.g., an offset time period) by skipping over or disregarding TXOPs (e.g., time periods) of other network operating entities. Thus, a BS may determine schedules without considering medium occupancy beyond a current TXOP 602.

FIG. 7 illustrates a scheduling scheme 700 for UL data transmissions according to embodiments of the present disclosure. The scheme 700 may be employed by the BSs 105, and 500 and the UEs 115 and 400. The scheme 700 is similar to the scheme 600, but illustrates scheduling and transmissions of UL data instead of ACK/NACKs. The scheme 700 may assign a value of 1 to the parameter K2 (e.g., the parameter 214). As shown, the BS transmits a DL control signal 720 in each slot 604. Each DL control signal 720 may include scheduling information. The scheduling information may indicate a UL grant for a UE to transmit UL data in a subsequent slot 604.

For example, in the TXOP $602_{a1}$, the UE transmits a UL data signal 722a in a slot 604 indexed S1 based on a UL grant received in a previous slot 604 indexed S0. Similar to the scheme 600, when the UE receives a UL grant in a last slot 604 (e.g., indexed S2) of the TXOP $602_{a1}$, the UE may skip over TXOPs of other network operating entities (e.g., the time period 606) and transmit a UL data signal 722c in a first or beginning slot 604 indexed S0 of a subsequent TXOP $602_{a2}$.

FIG. 8 illustrates a scheduling scheme 800 for feedback transmissions according to embodiments of the present disclosure. The scheme 800 may be employed by the BSs 105, and 500 and the UEs 115 and 400. The scheme 800 is similar to the scheme 600, but the header (e.g., the header 603) of a TXOP may be embedded in a first slot of the TXOP. Similar to the scheme 600, the BS may successfully contend for a plurality of TXOPs 802 in a shared frequency spectrum 601. The TXOPs 802 may be non-continuous in time. The TXOPs $802_{a1}$ and $802_{a2}$ are separated by a time period 606 corresponding to TXOPs of other network operating entities (e.g., Operators B and C). Each TXOP 802 includes a plurality of slots 604 similar to the slots 604. The first slot 604 (e.g., indexed S0) of each TXOP 802 may include a header 803. The header 803 may carry similar reservation signals as in the header 603, but may include preambles only or minimal trigger information. The BS may transmit DL control signals 620 and the UE may respond with ACK/NACK signals 622 using similar mechanisms as in the scheme 600. However, the UE may not be required to consider the header 803 in a subsequent TXOP $802_{a2}$ as a slot 604 when deferring an ACK/NACK transmission (e.g., the ACK/NACK signal 622c) for a schedule (e.g., the DL control signal 620c) in a last slot 604 (e.g., indexed S2) of a current TXOP $802_{a1}$. While the scheme 800 is described in the context of ACK/NACK scheduling, the scheme 800 may be used for scheduling UL data transmissions.

FIGS. 9-10 illustrate additional parameters that a UE (e.g., the UEs 115) may provide to a BS (e.g., the BSs 105) to further assist scheduling at the BS. In FIGS. 9-10, the x-axes represent time in some constant units and the y-axes represent frequency in some constant units. The pattern-filled boxes represent transmissions of DL control, UL data, and/or ACK/NACK feedbacks in corresponding slots.

FIG. 9 illustrates a scheduling scheme 900 according to embodiments of the present disclosure. The scheme 900 may be employed by the BSs 105 and 500 and the UEs 115 and 400. The scheme 900 is based on the TXOP structure or scenario shown in the schemes 600 and 700 with respect to FIGS. 6 and 7, respectively. The scheme 900 can be used in conjunction with the schemes 600 and 700. For example, a UE may include a parameter N3 and a parameter N4 in addition to parameters N1 and N2 described above when reporting capability information to a BS. The parameter N3 indicates an amount of time, for example, in number of OFDM symbols, required for UE processing from the end of a header trigger 910 (e.g., carried in a reservation request signal) to an earliest start of a corresponding ACK/NACK transmission. The parameter N4 indicates an amount of time, for example, in number of OFDM symbols, required for UE processing from the end of a header trigger 910 to an earliest start of a corresponding UL data transmission. Thus, the BS may determine a schedule for the UE based on the parameters N1, N2, N3, and/or N4.

For example, the BS may schedule the UE to transmit an ACK/NACK signal 622 in a first slot 604 indexed S0 based on the parameter N3 (e.g., shown as a time period 902). Alternatively, the BS may schedule the UE to transmit a UL data signal 722 in a first slot 604 indexed S0 based on the parameter N4 (e.g., shown as a time period 904).

FIG. 10 illustrates a scheduling scheme 1000 according to embodiments of the present disclosure. The scheme 1000 may be employed by the BSs 105 and 500 and the UEs 115 and 400. The scheme 1000 is based on the TXOP structure or scenario shown in the scheme 800 with respect to FIG. 8. The scheme 1000 can be used in conjunction with the scheme 800. The scheme 1000 is similar to the scheme 900. For example, a UE may report parameters N3 and N4 and a BS may schedule the UE based on the UE's parameters N3 and N4. As shown, the BS may schedule the UE to transmit an ACK/NACK signal 622 in a first slot 604 indexed S0 based on the parameter N3 (e.g., shown as a time period 1002 with respect to a header trigger 1010). Alternatively, the BS may schedule the UE to transmit a UL data signal 722 in a first slot 604 indexed S0 based on the parameter N4 (e.g., shown as a time period 1004 with respect to the header trigger 1010).

Figure 11:
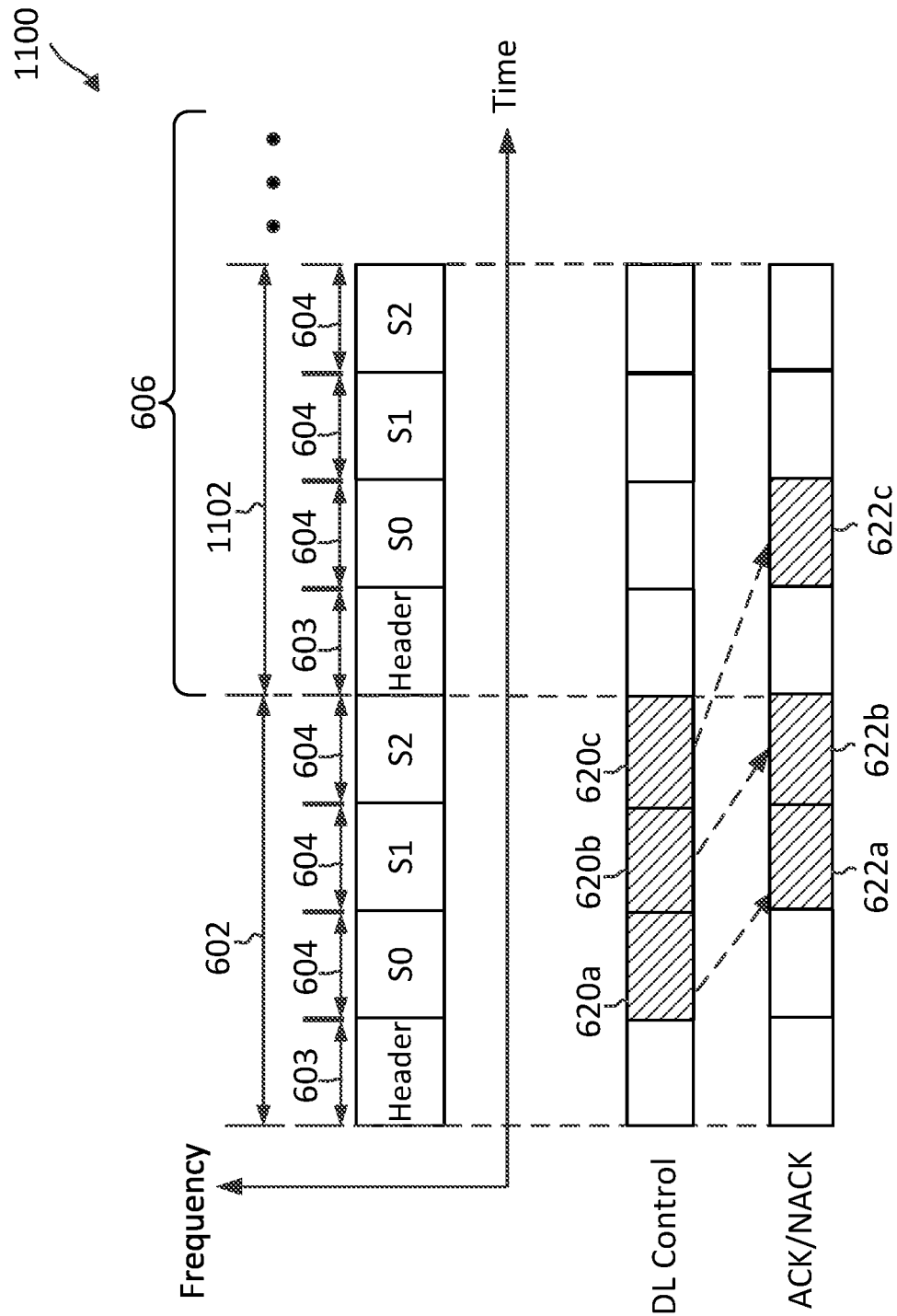
FIG. 11 illustrates a scheduling scheme for feedback transmissions according to embodiments of the present disclosure.

FIG. 11 illustrates a scheduling scheme 1100 for feedback transmissions according to embodiments of the present disclosure. The scheme 1100 may be employed by the BSs 105 and 500 and the UEs 115 and 400. The scheme 1100 allows a UE to transmit an ACK and/or an NACK in a TXOP of another network operating entity. For example, a BS of a particular operating entity (e.g., Operator A) may successfully contend for a TXOP 602 in a shared frequency spectrum 601. Subsequently, a node of another network operating entity (e.g., Operator B) may gain access to the frequency spectrum 601 in a TXOP 1102 (e.g., in a time period 606). The TXOP 1102 may include a similar slot structure as the TXOP 602 as shown. Alternatively, the TXOP 1102 may include a different slot structure. For example, the TXOP 1102 may include less than three slots 604 or more than three slots 604.

In the scheme 1100, when the UE receives a schedule (e.g., the DL control signal 620c) in a last slot (e.g., the slot 604 indexed S2) of a current TXOP (e.g., the TXOP 602a1) for an ACK/NACK transmission in a subsequent slot 604, the UE may transmit an ACK/NACK signal (e.g. the ACK/NACK signal 622c) using a resource of another network operating entity. The resource may be TDM, PDM, CDM, and/or SDM with a resource of the Operator B. As shown, the UE transmits the ACK/NACK signal 622c in a slot 604 indexed S0 of the TXOP 1102 of the Operator B.

In an embodiment, the Operator B may reserve at least some resources in a slot 604 (e.g., a beginning slot S0) of each TXOP 1102 for other operators (e.g., Operator A) to transmit ACK/NACK signals. The Operator B may reserve the resources by using TDM, FDM, CDM, and/or SDM. The reservation of ACK/NACK resources in a beginning slot 604 for another operator may not impact the performance of Operator B significantly since a UE of Operator B may not have any ACK/NACK transmissions in the beginning slot 604 of a TXOP 1102 when K1 is set to a value of 1. In some embodiments, the BS may indicate a different ACK/NACK schedule for a last slot 604 of a TXOP 602 based on the location of the resources reserved by the other operators.

The scheme 1100 may be more suitable for use with synchronized medium access since an operator may use a resource in a TXOP of another operator. While the scheme 1100 is illustrated with a slot structure having a header (e.g., the header 603) separate from a slot, the scheme 1100 may be applied to a slot structure having a header (e.g., the header 803) embedded in a beginning slot of a TXOP. The scheme 1100 may be used in conjunction with the schemes 900 and 1000 described above with respect to FIGS. 9 and 10, respectively. The scheme 1100 may also be applicable for transmissions of short packets, such as ultra-reliable low latency communication (URLLC) traffic, in addition to ACK/NACK signals. For example, a BS may schedule a short packet transmission based on the location of the resources reserved by other operators.

Figure 12:
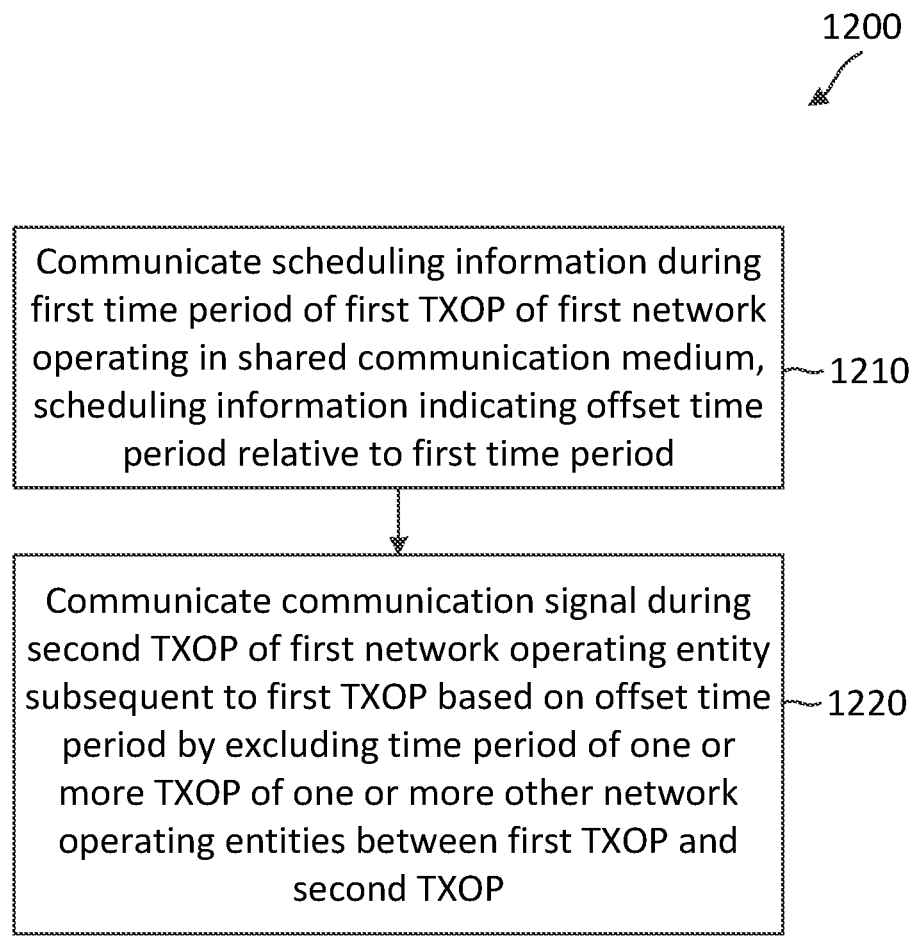
FIG. 12 is a flow diagram of a method for communicating in a shared communication medium according to embodiments of the present disclosure.

FIG. 12 is a flow diagram of a method 1200 for communicating in a shared communication medium according to embodiments of the present disclosure. Steps of the method 1200 can be executed by a computing device (e.g., a processor, processing circuit, and/or other suitable component) of a wireless communication device, such as the BSs 105 and 500 and the UEs 115 and 400. The method 1200 may employ similar mechanisms as in the schemes 600, 700, 800, 900, and 1000 described with respect to FIGS. 6, 7, 8, 9, and 10, respectively. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the method 1200 includes communicating, by a first wireless communication device and a second wireless communication device, scheduling information (e.g., the DL control signals 620 and 720) during a first time period (e.g., a last slot 604 indexed S2) of a first TXOP (e.g., the TXOPs $602_{a1}$ and $802_{a1}$) of a first network operating entity (e.g., Operator A) in a shared communication medium (e.g., the frequency spectrum 601). The scheduling information indicates an offset time period (e.g., the parameters K0, K1, and K2) relative to the first time period.

At step 1220, the method 1200 includes communicating, by the first wireless communication device and the second wireless communication device, a communication signal (e.g., the ACK/NACK signals 622 and UL data signals 722) during a second TXOP (e.g., the TXOPs $602_{a2}$ and $802_{a2}$) of the first network operating entity subsequent to the first TXOP based on the offset time period by excluding a time period (e.g., the time period 606) of one or more TXOPs of one or more other network operating entities (e.g., Operator B) between the first TXOP and the second TXOP.

In an embodiment, the first wireless communication device may correspond to a UE and the second wireless communication device may correspond to a BS. In such an embodiment, the communicating the scheduling information may include receiving the scheduling information. The communicating the communication signal may include transmitting the communication signal.

In another embodiment, the first wireless communication device may correspond to a BS and the second wireless communication device may correspond to a UE. In such an embodiment, the communicating the scheduling information may include transmitting the scheduling information. The communicating the communication signal may include receiving the communication signal. The first wireless communication device may further determine the scheduling information irrespective of a time period (e.g., the time period 606) of the one or more TXOPs of the one or more network operating entities.

The first wireless communication device may further determine a transmission time for the communication signal based on the offset time period by excluding the time period of the one or more TXOPs and a header slot (e.g., the header 603) of the plurality of slots in the second TXOP. Alternatively, the first wireless communication device may further determine a transmission time for the communication signal based on the offset time period by excluding the time period of the one or more TXOPs and including a header slot (e.g., the header 603) of the plurality of slots in the second TXOP.

The first wireless communication device may further receive capability information associated with the second wireless communication device including a response time period (e.g., the parameters N3 and N4) for the second wireless communication device to transmit at least one of an ACK signal, an NACK signal, or an UL data signal based on a header (e.g., the header triggers 910 and 1010) of a TXOP. The wireless communication device may further determine the offset time period (e.g., the time periods 902, 904, 1002, and 1004) based on the capability information.

Figure 13:
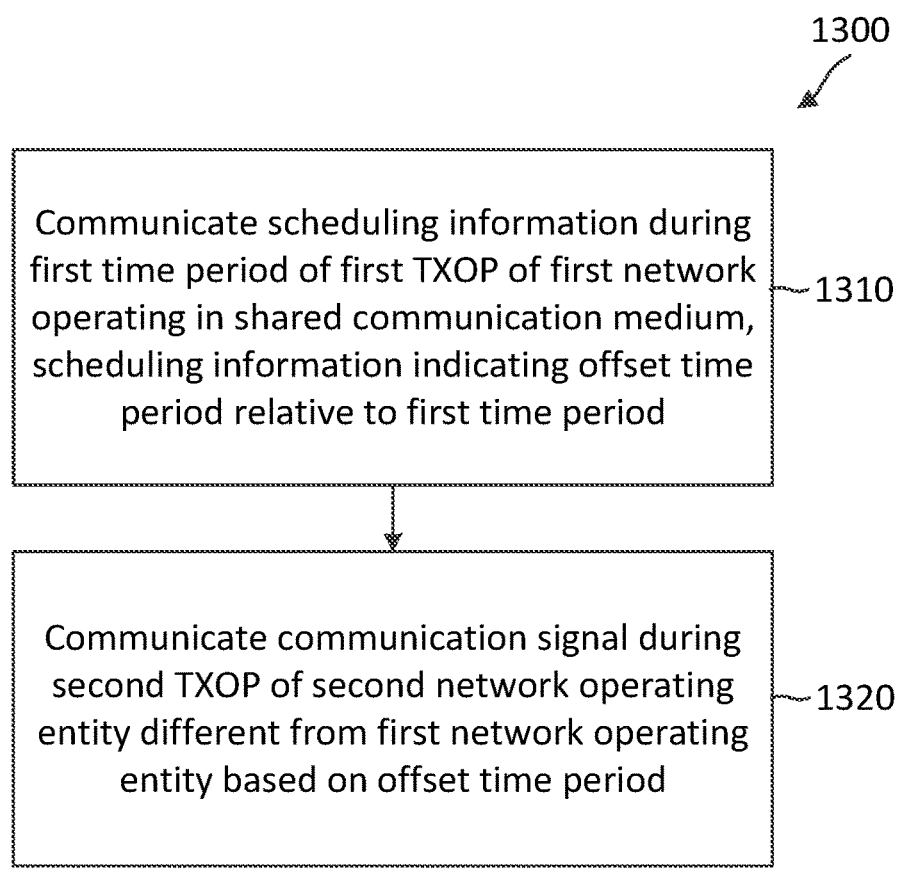
FIG. 13 is a flow diagram of a method for communicating in a shared communication medium according to embodiments of the present disclosure.

FIG. 13 is a flow diagram of a method 1300 for communicating in a shared communication medium according to embodiments of the present disclosure. Steps of the method 1300 can be executed by a computing device (e.g., a processor, processing circuit, and/or other suitable component) of a wireless communication device, such as the BSs 105 and 500 and the UEs 115 and 400. The method 1300 may employ similar mechanisms as in the schemes 900, 1000, and 1100, described with respect to FIGS. 9, 10, and 11, respectively. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the method 1300 includes communicating, by a first wireless communication device with a second wireless communication device, scheduling information (e.g., the DL control signals 620 and 720) during a first time period (e.g., a last slot 604 indexed S2) of a first TXOP (e.g., the TXOPs $602_{a1}$ and $802_{a1}$) of a first network operating entity (e.g., Operator A) in a shared communication medium (e.g., the frequency spectrum 601). The scheduling information indicates an offset time period (e.g., the parameter K1) relative to the first time period.

At step 1320, the method 1300 includes communicating, by the first wireless communication device with the second wireless communication device, a communication signal (e.g., the ACK/NACK signals 622 or URLLC traffic) during a second TXOP (e.g., the TXOP 1102) of a second network operating entity (e.g., Operator B) different from the first network operating entity based on the offset time period. For example, the communication signal may be communicated based on the location of a resource reserved by the second network operating entity.

In an embodiment, the communication signal is communicated using a resource that is at least one of frequency-division multiplexed, time-division multiplexed, code-division multiplexed, or spatial-division multiplexed with a resource of the second network operating entity.

In an embodiment, the first wireless communication signal may communicate, with the second wireless communication device, another communication signal in a third TXOP of the first network operating entity using a resource that is at least one of frequency-division multiplexed, time-division multiplexed, code-division multiplexed, or spatial-division multiplexed with a resource reserved for a third network operating entity (e.g., Operator B or C). For example, the resource may be in a beginning or first slot (e.g., a slot 604 indexed S0) of the third TXOP.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising communicating, by a first wireless communication device with a second wireless communication device, scheduling information during a first time period of a first transmission opportunity (TXOP) of a first network operating entity in a shared communication medium, the scheduling information indicating an offset time period relative to the first time period; and communicating, by the first wireless communication device with the second wireless communication device, a communication signal during a second TXOP of the first network operating entity subsequent to the first TXOP based on the offset time period by excluding a time period of one or more TXOPs of one or more other network operating entities between the first TXOP and the second TXOP.

In some embodiments, the communication signal includes an uplink data signal. In some embodiments, the communication signal includes at least one of an acknowledgement (ACK) signal or a negative acknowledgement (NACK) signal associated with a data reception. In some embodiments, each of the first TXOP and the second TXOP includes a plurality of slots, and wherein the first time period is one of the plurality of slots in the first TXOP. In some embodiments, the method further comprises determining, by the first wireless communication device, a transmission time for the communication signal based on the offset time period by excluding the time period of the one or more TXOPs and a header slot of the plurality of slots in the second TXOP. In some embodiments, the method further comprises determining, by the first wireless communication device, a transmission time for the communication signal based on the offset time period by excluding the time period of the one or more TXOPs and including a header slot of the plurality of slots in the second TXOP. In some embodiments, the method further comprises determining, by the first wireless communication device, the scheduling information irrespective of the time period of the one or more TXOPs of the one or more network operating entities. In some embodiments, the method further comprises receiving, by the first wireless communication device, capability information associated with the second wireless communication device including a response time period for the second wireless communication device to transmit at least one of an acknowledgement (ACK) signal, a negative acknowledgement (NACK) signal, or an uplink data signal based on a header of a TXOP; and determining, by the first wireless communication device, the offset time period based on the capability information.

Further embodiments of the present disclosure include a method of wireless communication, comprising communicating, by a first wireless communication device with a second wireless communication device, scheduling information during a first time period of a first transmission opportunity (TXOP) of a first network operating entity in a shared communication medium, the scheduling information indicating an offset time period relative to the first time period; and communicating, by the first wireless communication device with the second wireless communication device, a communication signal during a second TXOP of a second network operating entity different from first network operating entity based on the offset time period.

In some embodiments, the communication signal includes at least one of an acknowledgement (ACK) signal or a negative acknowledgement (NACK) signal associated with a data reception. In some embodiments, the communication signal includes uplink data traffic. In some embodiments, the communication signal includes uplink ultra-reliable low latency communication (URLLC) traffic. In some embodiments, the communication signal is communicated using a resource that is at least one of frequency-division multiplexed, time-division multiplexed, code-division multiplexed, or spatial-division multiplexed with a resource of the second network operating entity. In some embodiments, the method further comprises communicating, by the first wireless communication device with the second wireless communication device, another communication signal in a third TXOP of the first network operating entity using a resource that is at least one of frequency-division multiplexed, time-division multiplexed, code-division multiplexed, or spatial-division multiplexed with a resource reserved for a third network operating entity.

Further embodiments of the present disclosure include an apparatus comprising a transceiver configured to communicate, with a second wireless communication device, scheduling information during a first time period of a first transmission opportunity (TXOP) of a first network operating entity in a shared communication medium, the scheduling information indicating an offset time period relative to the first time period; and communicate, with the second wireless communication device, a communication signal during a second TXOP of the first network operating entity subsequent to the first TXOP based on the offset time period by excluding a time period of one or more TXOPs of one or more other network operating entities between the first TXOP and the second TXOP.

In some embodiments, the communication signal includes an uplink data signal. In some embodiments, the communication signal includes at least one of an acknowledgement (ACK) signal or a negative acknowledgement (NACK) signal associated with a data reception. In some embodiments, each of the first TXOP and the second TXOP includes a plurality of slots, and wherein the first time period is one of the plurality of slots in the first TXOP. In some embodiments, the apparatus further comprises a processor configured to determine a transmission time for the communication signal based on the offset time period by excluding the time period of the one or more TXOPs and a header slot of the plurality of slots in the second TXOP. In some embodiments, the apparatus further comprises a processor configured to determine a transmission time for the communication signal based on the offset time period by excluding the time period of the one or more TXOPs and including a header slot of the plurality of slots in the second TXOP. In some embodiments, the apparatus further comprises a processor configured to determine the scheduling information irrespective of the time period of the one or more TXOPs of the one or more network operating entities. In some embodiments, the transceiver is further configured to receive capability information associated with the second wireless communication device including a response time period for the second wireless communication device to transmit at least one of an acknowledgement (ACK) signal, a negative acknowledgement (NACK) signal, or an uplink data signal based on a header of a TXOP, and wherein the apparatus further comprises a processor configured to determine the offset time period based on the capability information.

Further embodiments of the present disclosure include an apparatus comprising a transceiver configured to communicate, with a second wireless communication device, scheduling information during a first time period of a first transmission opportunity (TXOP) of a first network operating entity in a shared communication medium, the scheduling information indicating an offset time period relative to the first time period; and communicate, with the second wireless communication device, a communication signal during a second TXOP of a second network operating entity different from first network operating entity based on the offset time period.

In some embodiments, the communication signal includes at least one of an acknowledgement (ACK) signal or a negative acknowledgement (NACK) signal associated with a data reception. In some embodiments, the communication signal includes uplink data traffic. In some embodiments, the communication signal includes uplink ultra-reliable low latency communication (URLLC) traffic. In some embodiments, the communication signal is communicated using a resource that is at least one of frequency-division multiplexed, time-division multiplexed, code-division multiplexed, or spatial-division multiplexed with a resource of the second network operating entity. In some embodiments, the transceiver is further configured to communicate, with the second wireless communication device, another communication signal in a third TXOP of the first network operating entity using a resource that is at least one of frequency-division multiplexed, time-division multiplexed, code-division multiplexed, or spatial-division multiplexed with a resource reserved for a third network operating entity.

Further embodiments of the present disclosure include a computer-readable medium having program code recorded thereon, the program code comprising code for causing a first wireless communication device to communicate, with a second wireless communication device, scheduling information during a first time period of a first transmission opportunity (TXOP) of a first network operating entity in a shared communication medium, the scheduling information indicating an offset time period relative to the first time period; and code for causing the first wireless communication device to communicate, with the second wireless communication device, a communication signal during a second TXOP of the first network operating entity subsequent to the first TXOP based on the offset time period by excluding a time period of one or more TXOPs of one or more other network operating entities between the first TXOP and the second TXOP.

In some embodiments, the communication signal includes an uplink data signal. In some embodiments, the communication signal includes at least one of an acknowledgement (ACK) signal or a negative acknowledgement (NACK) signal associated with a data reception. In some embodiments, each of the first TXOP and the second TXOP includes a plurality of slots, and wherein the first time period is one of the plurality of slots in the first TXOP. In some embodiments, the computer-readable medium further comprises code for causing the first wireless communication device to determine a transmission time for the communication signal based on the offset time period by excluding the time period of the one or more TXOPs and a header slot of the plurality of slots in the second TXOP. In some embodiments, the computer-readable medium further comprises code for causing the first wireless communication device to determine a transmission time for the communication signal based on the offset time period by excluding the time period of the one or more TXOPs and including a header slot of the plurality of slots in the second TXOP. In some embodiments, the computer-readable medium further comprises code for causing the first wireless communication device to determine the scheduling information irrespective of the time period of the one or more TXOPs of the one or more network operating entities. In some embodiments, the computer-readable medium further comprises code for causing the first wireless communication device to receive capability information associated with the second wireless communication device including a response time period for the second wireless communication device to transmit at least one of an acknowledgement (ACK) signal, a negative acknowledgement (NACK) signal, or an uplink data signal based on a header of a TXOP; and code for causing the first wireless communication device to determine the offset time period based on the capability information.

Further embodiments of the present disclosure include a computer-readable medium having program code recorded thereon, the program code comprising code for causing a first wireless communication device to communicate, with a second wireless communication device, scheduling information during a first time period of a first transmission opportunity (TXOP) of a first network operating entity in a shared communication medium, the scheduling information indicating an offset time period relative to the first time period; and code for causing the first wireless communication device to communicate, with the second wireless communication device, a communication signal during a second TXOP of a second network operating entity different from first network operating entity based on the offset time period.

In some embodiments, the communication signal includes at least one of an acknowledgement (ACK) signal or a negative acknowledgement (NACK) signal associated with a data reception. In some embodiments, the communication signal includes uplink data traffic. In some embodiments, the communication signal includes uplink ultra-reliable low latency communication (URLLC) traffic. In some embodiments, the communication signal is communicated using a resource that is at least one of frequency-division multiplexed, time-division multiplexed, code-division multiplexed, or spatial-division multiplexed with a resource of the second network operating entity. In some embodiments, the computer-readable medium further comprises code for causing the first wireless communication device to communicate, with the second wireless communication device, another communication signal in a third TXOP of the first network operating entity using a resource that is at least one of frequency-division multiplexed, time-division multiplexed, code-division multiplexed, or spatial-division multiplexed with a resource reserved for a third network operating entity.

Further embodiments of the present disclosure include an apparatus comprising means for communicating, with a second wireless communication device, scheduling information during a first time period of a first transmission opportunity (TXOP) of a first network operating entity in a shared communication medium, the scheduling information indicating an offset time period relative to the first time period; and means for communicating, with the second wireless communication device, a communication signal during a second TXOP of the first network operating entity subsequent to the first TXOP based on the offset time period by excluding a time period of one or more TXOPs of one or more other network operating entities between the first TXOP and the second TXOP.

In some embodiments, the communication signal includes an uplink data signal. In some embodiments, the communication signal includes at least one of an acknowledgement (ACK) signal or a negative acknowledgement (NACK) signal associated with a data reception. In some embodiments, each of the first TXOP and the second TXOP includes a plurality of slots, and wherein the first time period is one of the plurality of slots in the first TXOP. In some embodiments, the apparatus further comprises means for determining a transmission time for the communication signal based on the offset time period by excluding the time period of the one or more TXOPs and a header slot of the plurality of slots in the second TXOP. In some embodiments, the apparatus further comprises means for determining a transmission time for the communication signal based on the offset time period by excluding the time period of the one or more TXOPs and including a header slot of the plurality of slots in the second TXOP. In some embodiments, the apparatus further comprises means for determining the scheduling information irrespective of the time period of the one or more TXOPs of the one or more network operating entities. In some embodiments, the apparatus further comprises means for receiving capability information associated with the second wireless communication device including a response time period for the second wireless communication device to transmit at least one of an acknowledgement (ACK) signal, a negative acknowledgement (NACK) signal, or an uplink data signal based on a header of a TXOP; and means for determining the offset time period based on the capability information.

Further embodiments of the present disclosure include an apparatus comprising means for communicating, with a second wireless communication device, scheduling information during a first time period of a first transmission opportunity (TXOP) of a first network operating entity in a shared communication medium, the scheduling information indicating an offset time period relative to the first time period; and means for communicating, with the second wireless communication device, a communication signal during a second TXOP of a second network operating entity different from first network operating entity based on the offset time period.

In some embodiments, the communication signal includes at least one of an acknowledgement (ACK) signal or a negative acknowledgement (NACK) signal associated with a data reception. In some embodiments, the communication signal includes uplink data traffic. In some embodiments, the communication signal includes uplink ultra-reliable low latency communication (URLLC) traffic. In some embodiments, the communication signal is communicated using a resource that is at least one of frequency-division multiplexed, time-division multiplexed, code-division multiplexed, or spatial-division multiplexed with a resource of the second network operating entity. In some embodiments, the apparatus further comprises means for communicating, with the second wireless communication device, another communication signal in a third TXOP of the first network operating entity using a resource that is at least one of frequency-division multiplexed, time-division multiplexed, code-division multiplexed, or spatial-division multiplexed with a resource reserved for a third network operating entity.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
communicating, by a first wireless communication device with a second wireless communication device, scheduling information during a first time period of a first transmission opportunity (TXOP) of a first network operating entity in a shared communication medium, the scheduling information indicating an offset time period relative to the first time period; and
communicating, by the first wireless communication device with the second wireless communication device and based on the offset time period, a communication signal including an acknowledgment (ACK) signal or a negative acknowledgment (NACK) signal during a second time period within a second TXOP of a second network operating entity different from the first network operating entity subsequent to the first TXOP, the second time period reserved for the first network operating entity to communicate the ACK signal or the NACK signal.

2. The method of claim 1, further comprising:
receiving, by the first wireless communication device, capability information associated with the second wireless communication device including a response time period for the second wireless communication device to transmit at least one of an acknowledgement (ACK) signal, a negative acknowledgement (NACK) signal, or an uplink data signal based on a header of a TXOP; and
determining, by the first wireless communication device, the offset time period based on the capability information.

3. The method of claim 1, wherein the communication signal is communicated using a resource that is at least one of frequency-division multiplexed, time-division multiplexed, code-division multiplexed, or spatial-division multiplexed with a resource of the second network operating entity.

4. The method of claim 1, further comprising:
communicating, by the first wireless communication device with the second wireless communication device, another communication signal in a third TXOP of the first network operating entity using a resource that is at least one of frequency-division multiplexed, time-division multiplexed, code-division multiplexed, or spatial-division multiplexed with a resource reserved for a third network operating entity.

5. The method of claim 1, wherein the communication signal includes an uplink data signal.

6. The method of claim 1, wherein the ACK signal or the NACK signal includes a hybrid automatic repeat request (HARQ) acknowledgement signal or a HARQ negative acknowledgement signal, respectively.

7. The method of claim 1, wherein the communication signal includes uplink ultra-reliable low latency communication (URLLC) traffic.

8. An apparatus comprising:
a transceiver configured to:
communicate, with a second wireless communication device, scheduling information during a first time period of a first transmission opportunity (TXOP) of a first network operating entity in a shared communication medium, the scheduling information indicating an offset time period relative to the first time period; and
communicate, with the second wireless communication device and based on the offset time period, a communication signal including an acknowledgment (ACK) signal or a negative acknowledgment (NACK) signal during a second time period within a second TXOP of a second network operating entity different from the first network operating entity subsequent to the first TXOP,
the second time period reserved for the first network operating entity to communicate the ACK signal or the NACK signal.

9. The apparatus of claim 8, wherein the transceiver is further configured to receive capability information associated with the second wireless communication device including a response time period for the second wireless communication device to transmit at least one of an acknowledgement (ACK) signal, a negative acknowledgement (NACK) signal, or an uplink data signal based on a header of a TXOP, and wherein the apparatus further comprises a processor configured to determine the offset time period based on the capability information.

10. The apparatus of claim 8, wherein the communication signal is communicated using a resource that is at least one of frequency-division multiplexed, time-division multiplexed, code-division multiplexed, or spatial-division multiplexed with a resource of the network operating entity.

11. The apparatus of claim 8, wherein the transceiver is further configured to:
communicate, with the second wireless communication device, another communication signal in a third TXOP of the first network operating entity using a resource that is at least one of frequency-division multiplexed, time-division multiplexed, code-division multiplexed, or spatial-division multiplexed with a resource reserved for a third network operating entity.

12. The apparatus of claim 8, wherein the ACK signal or the NACK signal includes a hybrid automatic repeat request (HARQ) acknowledgement signal or a HARQ negative acknowledgement signal, respectively.

13. A non-transitory computer-readable medium having program code recorded thereon, the program code comprising:

code for causing a first wireless communication device to communicate, with a second wireless communication device, scheduling information during a first time period of a first transmission opportunity (TXOP) of a first network operating entity in a shared communication medium, the scheduling information indicating an offset time period relative to the first time period; and
code for causing the first wireless communication device to communicate, with the second wireless communication device and based on the offset time period, a communication signal including an acknowledgment (ACK) signal or a negative acknowledgment (NACK) signal during a second time period within a second TXOP of a second network operating entity different from the first network operating entity subsequent to the first TXOP based on the offset time period,
the second time period reserved for the first network operating entity to communicate the ACK signal or the NACK signal.

14. The computer-readable medium of claim 13, further comprising:
code for causing the first wireless communication device to receive capability information associated with the second wireless communication device including a response time period for the second wireless communication device to transmit at least one of an acknowledgement (ACK) signal, a negative acknowledgement (NACK) signal, or an uplink data signal based on a header of a TXOP; and
code for causing the first wireless communication device to determine the offset time period based on the capability information.

15. The computer-readable medium of claim 13, wherein the communication signal is communicated using a resource that is at least one of frequency-division multiplexed, time-division multiplexed, code-division multiplexed, or spatial-division multiplexed with a resource of the second network operating entity.

16. The computer-readable medium of claim 13, further comprising:
code for causing the first wireless communication device to communicate, with the second wireless communication device, another communication signal in a third TXOP of the first network operating entity using a resource that is at least one of frequency-division multiplexed, time-division multiplexed, code-division multiplexed, or spatial-division multiplexed with a resource reserved for a third network operating entity.

17. The computer-readable medium of claim 13, wherein the ACK signal or the NACK signal includes a hybrid automatic repeat request (HARQ) acknowledgement signal or a HARQ negative acknowledgement signal, respectively.

18. The apparatus of claim 8, wherein the communication signal includes an uplink data signal.

19. The apparatus of claim 8, wherein the communication signal includes uplink ultra-reliable low latency communication (URLLC) traffic.

20. The computer-readable medium of claim 13, wherein the communication signal includes an uplink data signal.

21. The computer-readable medium of claim 13, wherein the communication signal includes uplink ultra-reliable low latency communication (URLLC) traffic.

* * * * *